United States Patent
He et al.

(10) Patent No.: US 8,419,256 B2
(45) Date of Patent: Apr. 16, 2013

(54) SIDE LIGHT TYPE BACKLIGHT MODULE AND BACK PLATE HEAT DISSIPATION STRUCTURE THEREOF

(75) Inventors: Chengming He, Shenzhen (CN); Guofu Tang, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 310 days.

(21) Appl. No.: 12/991,494

(22) PCT Filed: Sep. 30, 2010

(86) PCT No.: PCT/CN2010/077550
§ 371 (c)(1),
(2), (4) Date: Nov. 8, 2010

(87) PCT Pub. No.: WO2012/006820
PCT Pub. Date: Jan. 19, 2012

(65) Prior Publication Data
US 2012/0206941 A1    Aug. 16, 2012

(30) Foreign Application Priority Data
Jul. 12, 2010    (CN) .......................... 2010 1 0225575

(51) Int. Cl.
*F21V 7/04* (2006.01)
(52) U.S. Cl.
USPC .......................................... 362/613; 362/612
(58) Field of Classification Search .................. 362/612, 362/613
See application file for complete search history.

(56) References Cited

U.S. PATENT DOCUMENTS

| 8,031,292 | B2* | 10/2011 | Chun et al. | 349/65 |
| 8,085,358 | B2* | 12/2011 | Lu et al. | 349/58 |
| 2008/0304288 | A1* | 12/2008 | Iwasaki | 362/632 |
| 2009/0034288 | A1 | 2/2009 | Ho et al. | |
| 2009/0086505 | A1* | 4/2009 | Iwasaki et al. | 362/612 |
| 2009/0288340 | A1* | 11/2009 | Hess | 47/58.1 LS |

FOREIGN PATENT DOCUMENTS

| CN | 1955814 A | 5/2007 |
| CN | 101017278 A | 8/2007 |
| CN | 101303479 A | 11/2008 |
| CN | 201417353 Y | 3/2010 |
| CN | 201531855 U | 7/2010 |
| WO | 2008090642 A1 | 7/2008 |

* cited by examiner

*Primary Examiner* — Evan Dzierzynski
(74) *Attorney, Agent, or Firm* — Cheng-Ju Chiang (57) ABSTRACT

The present invention discloses a side light type backlight module and a back plate heat dissipation structure thereof. The back plate heat dissipation structure comprises a bottom part, at least one side wall part and an extension part. The bottom part forms a main body of the back plate heat dissipation structure. The side wall part is formed by at least one edge of the bottom part extending upwards for at least one light source set attached on the inner surface thereof. The extension part is formed by the edge of the bottom part extending upwards. The heat generated by the light source set is conducted to the extension part and the bottom part through the top and the bottom of the side wall part. The total heat dissipation efficiency of the side light type backlight module can be raised by a dual way heat dissipation module.

7 Claims, 5 Drawing Sheets

SIDE LIGHT TYPE BACKLIGHT MODULE AND BACK PLATE HEAT DISSIPATION STRUCTURE THEREOF

BACKGROUND OF THE INVENTION

1. Field of the Invention

The present invention generally relates to a side light type backlight module and a back plate heat dissipation structure thereof, and more particularly to a side light type backlight module and a back plate heat dissipation structure thereof capable of raising the heat dissipation efficiency.

2. Description of Prior Art

Figure 1:
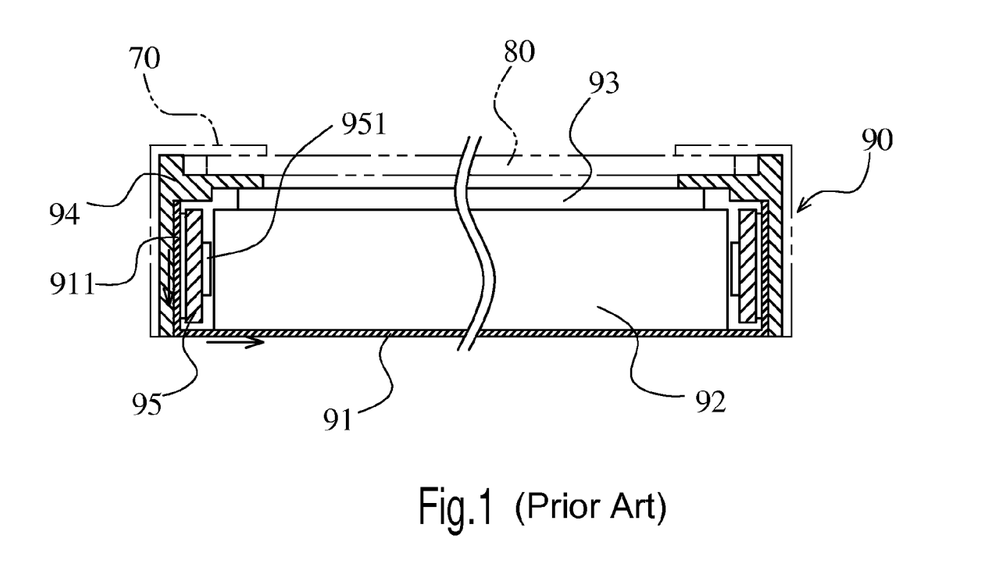
FIG. 1 shows a lateral sectional view diagram of a side light type backlight module according to prior art.

In the field of LCD panels, there are advantages of energy saving and environment protecting for employing LEDs as backlight sources rather than CCFLs. Therefore, it is a certain trend for a backlight development to replace CCFL with LED but the head dissipation issue remains an important factor which effects the development. Please refer to FIG. 1. FIG. 1 shows a lateral sectional view diagram of a side light type backlight module according to prior art. A side light type backlight module 90 comprises a back plate heat dissipation structure 91. Side wall parts 911 are positioned at two side edges of the back plate heat dissipation structure 91 and a light guide plate 92 is installed at the center of the back plate heat dissipation structure 91. An optical film set 93 is installed on the light guide plate 92. Beside, a housing 94 covers the periphery of the back plate heat dissipation structure 91 and fixes the optical film set 93 and the light guide plate 92 from top to bottom for completing the side light type backlight module 90. Furthermore, a liquid crystal panel 80 overlays on the side light type backlight module 90. The liquid crystal panel 80 and the side light type backlight module 90 are covered and fixed by a shell 70 for assembling a LCD.

As shown in FIG. 1, a light source set 95 is positioned at the inner surface of the side wall part 911 in the back plate heat dissipation structure 91 of the side light type backlight module 90. The light source set 95 comprises several lighting elements 951. The lighting elements 951 can be LED lighting elements and the light direction of the lighting elements 951 is directed toward the light guide plate 92. Generally, the lighting elements 951 are fixed to the side wall part 911 with screws, thermal tapes or etc. The heat generated during the functioning of the light source set 95 are conducted through the side wall part 911 downwards then conducted to the center of the back plate heat dissipation structure 91 inwards for dissipating the heat as shown by the arrows in figure.

Figure 2:
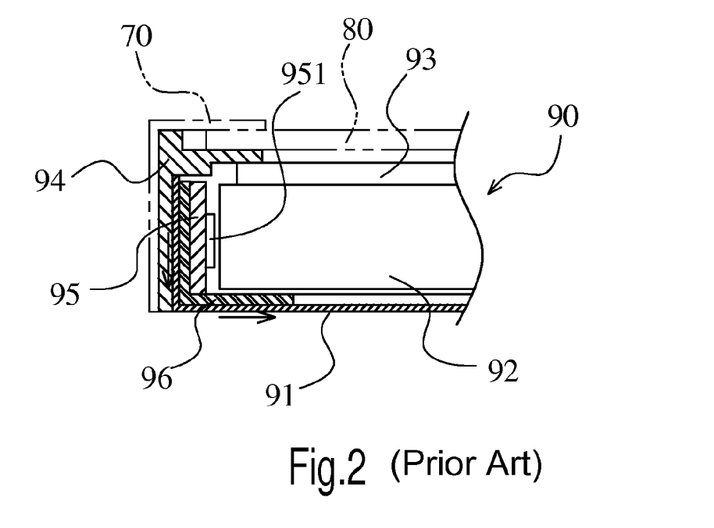
FIG. 2 shows a partial lateral sectional view diagram of another side light type backlight module according to prior art.

Please refer to FIG. 2. FIG. 2 shows a partial lateral sectional view diagram of another side light type backlight module according to prior art. The side light type backlight module 90 in FIG. 2 is similar with the side light type backlight module 90 in FIG. 1. The difference is: The side light type backlight module 90 in FIG. 2 further comprises a heat conducting block 96 positioned between the light source set 95 and the back plate heat dissipation structure 91. The heat conducting block 96 is approximately L shaped and attached to the back plate heat dissipation structure 91 and the side wall part 911. Generally, the heat conducting block 96 is manufactured by injection molding with aluminous materials. Because the aluminous heat conducting block 96 has better heat conduction property and the contact area with the back plate heat dissipation structure 91 is enlarged further. Therefore, the heat generated by the light source set 95 can be conducted to the center of the back plate heat dissipation structure 91 through the side wall part 911 more quickly for functioning heat dissipation.

However, an issue still remains for the aforesaid two kinds of side light type backlight modules. That is, the side wall part 911 of the back plate heat dissipation structure 91 does not extend further. The heat generated by the light source set 95 can only conducted in a single way to the center of the back plate heat dissipation structure 91 through the bottom of the side wall part 911. The heat dissipation efficiency of the back plate heat dissipation structure 91 cannot be raised.

Consequently, there is a need to provide a side light type backlight module and a back plate heat dissipation structure thereof for solving the existing issues of prior art.

SUMMARY OF THE INVENTION

An objective of the present invention is to provide a back plate heat dissipation structure of a side light type backlight module, in which the side wall part can conducts the heat through an extension part at the top and an bottom part at the bottom for proceeding two way heat conduction to raise the heat dissipation efficiency of the back plate heat dissipation structure significantly with the extension part formed by the top of the side wall part extending outwards when at least one light source set generates the heat at the side wall part.

For realizing the aforesaid objective, the present invention provides a back plate heat dissipation structure of a side light type backlight module, comprising:

- a bottom part, forming a main body of the back plate heat dissipation structure; and
- at least one side wall part, formed by at least one edge of the bottom part extending upwards from the bottom part, wherein at least one light source set is attached to the inner surface of the side wall part;
- wherein the back plate heat dissipation structure further comprises an extension part, formed by the top of the side wall part extending outwards, wherein the heat generated by the at least one light source at the side wall part is conducted to the extension part through the top of the side wall part and conducted to the bottom part through the bottom of the side wall part.

For realizing the aforesaid another objective, the present invention provides a side light type backlight module, comprising:

- a back plate heat dissipation structure, comprising: a bottom part and at least one side wall part, and the bottom part is a main body of the back plate heat dissipation structure, and the at least side wall part is formed by at least one edge of the bottom part extending upwards from the bottom part;
- a light guide plate, positioned on the back plate heat dissipation structure; and
- at least one light source set, positioned at the inner surface of the side wall part and between the side wall part and the light guide plate;
- wherein the back plate heat dissipation structure of the side light type backlight module further comprises an extension part, formed by the top of the side wall part of the back plate heat dissipation structure extending outwards, wherein the heat generated by the at least one light source at the side wall part is conducted to the extension part through the top of the side wall part and conducted to the bottom part through the bottom of the side wall part.

In one embodiment of the present invention, the extension part comprises: a first horizontal extension part, formed by the top of the side wall part extending outwards horizontally; and a first vertical extension part, formed by the outer of the first horizontal extension part extending downwards vertically, and a distance exists between the first vertical extension part and the side wall part.

In one embodiment of the present invention, at least one heat conductive material or at least one heat pipe is positioned between the side wall part and the first vertical extension part.

In one embodiment of the present invention, a plurality of penetrating thermal vias is positioned on the side wall part and the first vertical extension part for exposing a back side of a circuit board of the at least one light source set.

In one embodiment of the present invention, the extension part further comprises: a second horizontal extension part, formed by the bottom of the first vertical extension part extending outwards horizontally; and a second vertical extension part, formed by the outer of the second horizontal extension part extending upwards vertically.

In one embodiment of the present invention, at least one heat conductive material or at least one heat pipe is positioned between the first vertical extension part and the second vertical extension part.

In one embodiment of the present invention, a plurality of penetrating thermal vias is positioned on the side wall part, the first vertical extension part and the second vertical extension part for exposing a back side of a circuit board of the at least one light source set.

In one embodiment of the present invention, the extension part further comprises: a second horizontal extension part, formed by the bottom of the first vertical extension part extending inwards horizontally under the bottom part.

In one embodiment of the present invention, at least one heat conductive material or at least one heat pipe is positioned between the side wall part and the second horizontal extension part.

In one embodiment of the present invention, the extension part further comprises: a third horizontal extension part, formed by the top of the second vertical extension part extending outwards horizontally; and a third vertical extension part, formed by the outer of the third horizontal extension part downwards vertically.

In one embodiment of the present invention, at least one heat conductive material or at least one heat pipe is positioned between the second vertical extension part and the third vertical extension part.

In one embodiment of the present invention, a plurality of penetrating thermal vias is positioned on the side wall part, the first vertical extension part, the second vertical extension part and the third vertical extension part for exposing a back side of a circuit board of the at least one light source set.

In one embodiment of the present invention, the at least one side wall part comprises a circuit board and a lighting element, and the circuit board is attached to the inner surface of the side wall part, and the light direction of the lighting element is directed toward the light guide plate.

DETAILED DESCRIPTION OF THE INVENTION

Figure 3:
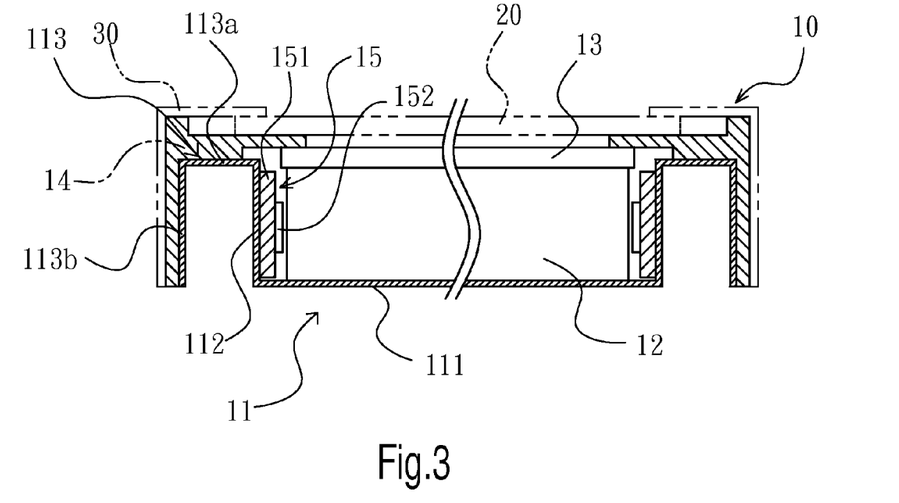
FIG. 3 shows a lateral sectional view diagram of a side light type backlight module according to the first embodiment of the present invention.

For a better understanding the aforementioned content of the present invention, preferable embodiments are illustrated in accordance with the attached figures for further explanation:

Please refer to FIG. 3. FIG. 3 shows a lateral sectional view diagram of a side light type backlight module according to the first embodiment of the present invention. The side light type backlight module 10 comprises a back plate heat dissipation structure 11, a light guide plate 12, an optical film set 13, a housing 14 and at least one light source set 15. The back plate heat dissipation structure 11 comprises a bottom part 111 and at least one side wall part 112. The bottom part 111 is a rectangle shaped main body of the back plate heat dissipation structure. The at least one side wall part 112 is formed by at least one edge of the bottom part 111 extending upwards from the bottom part 111. The light guide plate 12 is positioned on the back plate heat dissipation structure 11; the optical film set 13 is installed on the light guide plate 12; the housing 14 covers the periphery of the back plate heat dissipation structure 11 and fixes the optical film set 13 and the light guide plate 12 on the back plate heat dissipation structure 11. Beside, the at least one light source set 15 is positioned at the inner surface of the side wall part 112. The at least one light source set 15 comprise a circuit board 151 and a lighting element 152. The circuit board 151 is attached to the inner surface of the side wall part 112. The light direction of the lighting element 152 is directed toward the light guide plate 12.

Figure 4:
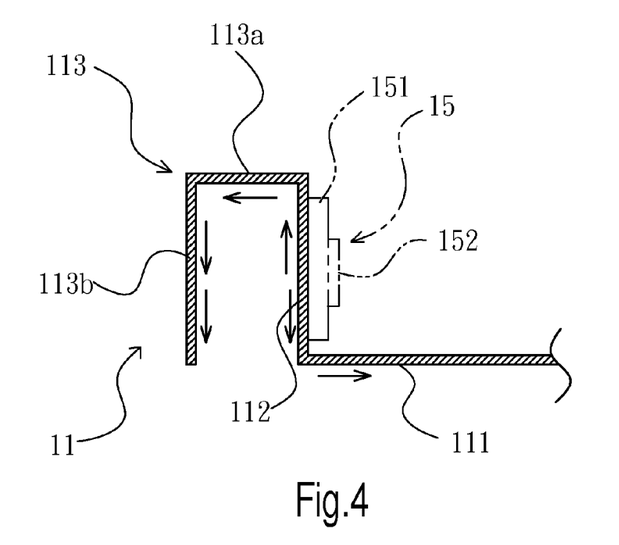
FIG. 4 shows a partial lateral sectional view diagram of a back plate heat dissipation structure of a side light type backlight module according to the first embodiment of the present invention.

Please refer to FIG. 3 and FIG. 4. FIG. 4 shows a partial lateral sectional view diagram of a back plate heat dissipation structure of a side light type backlight module according to the first embodiment of the present invention. The back plate heat dissipation structure 11 of the side light type backlight module 10 further comprises an extension part 113. The extension part 113 is a portion extended outwards from the top of the side wall part 112 of the back plate heat dissipation structure 11. In the first embodiment of the present invention, the extension part 113 comprises a first horizontal extension part 113a and a first vertical extension part 113b. The first horizontal extension part 113a is formed by the top of the side wall part 112 extending outwards horizontally; the first vertical extension part 113b is formed by the outer of the first horizontal extension part 113a extending downwards vertically. A distance exists between the first vertical extension part 113b and the side wall part 112.

Besides, the lighting element 152 of the light source set 15 is preferably a LED lighting element 152 and the light direction of the lighting element 152 is directed toward the light guide plate. Moreover, the circuit board 151 of the light source set 15 is generally fixed to the inner surface of the side wall part 112 with screws, thermal tapes or etc. In the present invention, the bottom part 111 of the back plate heat dissipation structure 11, the side wall part 112 and the extension part 113 are preferably formed as a jointless sheetmetal. Therefore, the heat generated by the lighting element 152 can be conducted to the side wall part 112 of the circuit board 151. As shown by the arrows in FIG. 4, the heat near the bottom of the side wall part 112 is conducted to the center of the back plate heat dissipation structure 11; meanwhile, the heat near the top of the side wall part 112 is conducted to the first horizontal extension part 113a and the first vertical extension part 113b of the extension part 113.

As aforementioned, the heat generated by the lighting element 152 is dissipated by two ways. Because a distance between the first vertical extension part 113b and the side wall part 112 exists, the heat near the side wall part 112 can also be conducted through the air in this area, too. Therefore, the extension part 113 formed by the first horizontal extension part 113a and the first vertical extension part 113b can conduct the heat generated by the at least one light source set 15 near the top of the side wall part 112 to raise the heat dissipation efficiency of the side light type backlight module 10.

Figure 5:
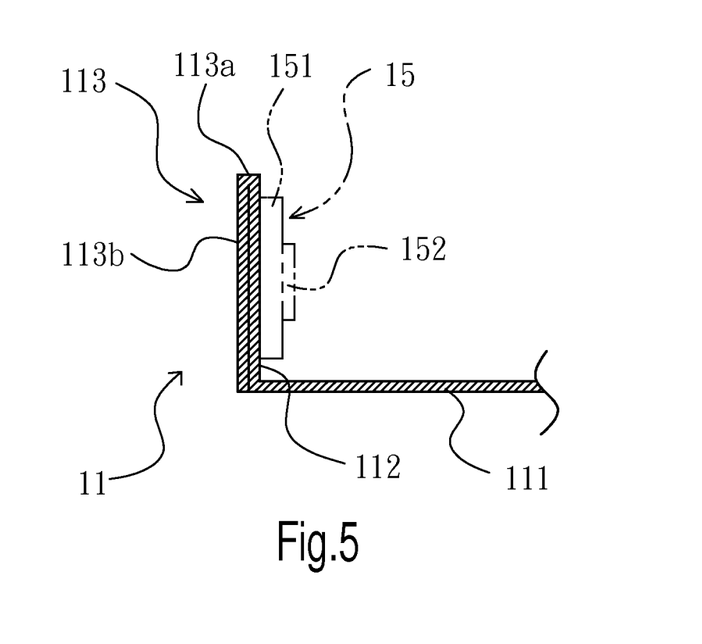
FIG. 5 shows a partial lateral sectional view diagram of a back plate heat dissipation structure of a side light type backlight module according to the second embodiment of the present invention.

Please refer to FIG. 5. FIG. 5 shows a partial lateral sectional view diagram of a back plate heat dissipation structure of a side light type backlight module according to the second embodiment of the present invention. The back plate heat dissipation structure 11 in the second embodiment of the present invention is similar with the side light type backlight module 11 in the first embodiment. Therefore, the same indicator and name are followed. The difference is: in the extension part 113 of the back plate heat dissipation structure 11, the first vertical extension part 113b is substantially contiguously attached to the side wall part 112. Therefore, the heat at the side wall part 112 (including the heat near the top) can be dissipated through the first vertical extension part 113b. The heat dissipation efficiency of the side light type backlight module 10 still can be raised. This embodiment can be applied in design which the side light type backlight module 10 is narrower.

Figure 6:
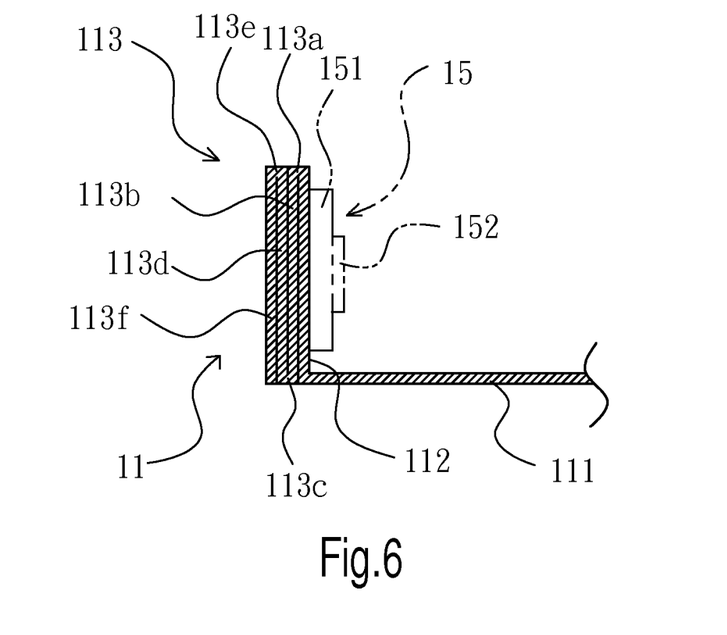
FIG. 6 shows a partial lateral sectional view diagram of a back plate heat dissipation structure of a side light type backlight module according to the third embodiment of the present invention.

Please refer to FIG. 6. FIG. 6 shows a partial lateral sectional view diagram of a back plate heat dissipation structure of a side light type backlight module according to the third embodiment of the present invention. The back plate heat dissipation structure 11 in the third embodiment of the present invention is similar with the side light type backlight module 11 in the second embodiment. Therefore, the same indicator and name are followed. The difference is: the extension part 113 of the back plate heat dissipation structure 11 in the third embodiment of the present invention further comprises a second horizontal extension part 113c, formed by the bottom of the first vertical extension part 113b extending outwards horizontally; and a second vertical extension part 113d, formed by the outer of the second horizontal extension part 113c extending upwards vertically. Alternatively, the extension part 113 can further comprise a third horizontal extension part 113e, formed by the top of the second vertical extension part 113d extending outwards horizontally; and a third vertical extension part 113f, formed by the outer of the third horizontal extension part 113e downwards vertically. The first vertical extension part 113b is substantially contiguously attached to the side wall part 112. The second vertical extension part 113d is substantially contiguously attached to the first vertical extension part 113b. The third vertical extension part 113f is substantially contiguously attached to the second vertical extension part 113d. Therefore, the heat conduction area can be increased by the first vertical extension part 113b, second vertical extension part 113d and third vertical extension part 113f and the heat at the side wall part 112 (including the heat near the top) can be dissipated. Not only the heat dissipation efficiency of the side light type backlight module can be raised, the material cost also can be reduced rather than the manner of enlarging the heat dissipation area with the aluminous heat conducting block according to prior art (as shown in FIG. 2).

Figure 7:
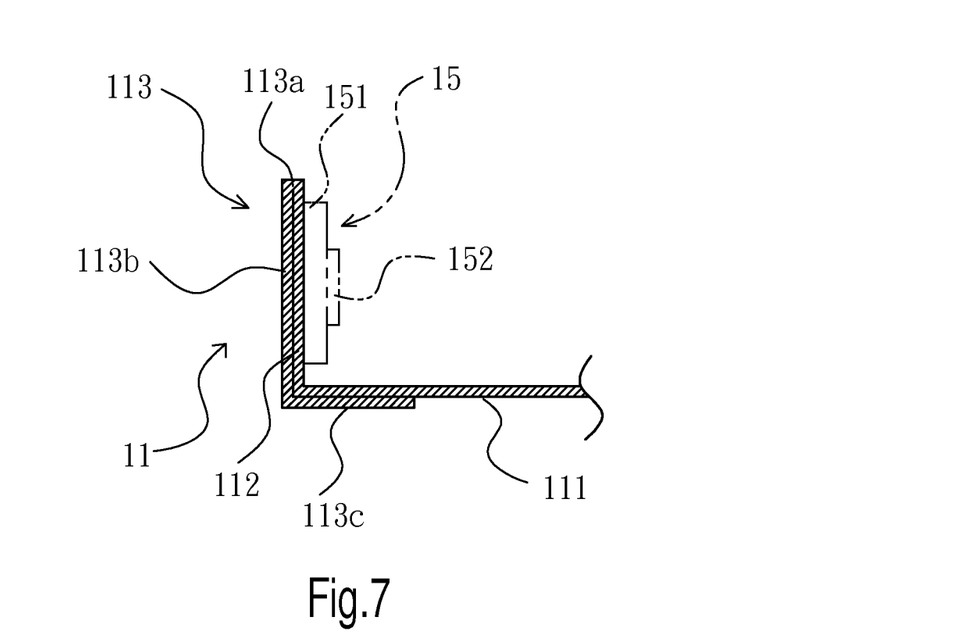
FIG. 7 shows a partial lateral sectional view diagram of a back plate heat dissipation structure of a side light type backlight module according to the fourth embodiment of the present invention.

Please refer to FIG. 7. FIG. 7 shows a partial lateral sectional view diagram of a back plate heat dissipation structure of a side light type backlight module according to the fourth embodiment of the present invention. The back plate heat dissipation structure 11 in the fourth embodiment of the present invention is similar with the side light type backlight module 11 in the second embodiment. Therefore, the same indicator and name are followed. The difference is: the extension part 113 of the back plate heat dissipation structure 11 in the fourth embodiment of the present invention further comprises a second horizontal extension part 113c. The second horizontal extension part 113c is formed by the bottom of the first vertical extension part 113b extending inwards or outwards horizontally. As shown in FIG. 7, the second horizontal extension part 113c is formed by the bottom of the first vertical extension part 113b extending inwards under the main body of the back plate heat dissipation structure 11 (the bottom part 111). Besides, the second horizontal extension part 113c is contiguously attached to the main body of the back plate heat dissipation structure 11 (the bottom part 111). Therefore, the heat at the side wall part 112 (including the heat near the top) can be conducted to the center of the back plate heat dissipation structure 11 through the first vertical extension part 113b and the second horizontal extension part 113c to realize the objective of raising the heat dissipation efficiency of the side light type backlight module 10.

Figure 8:
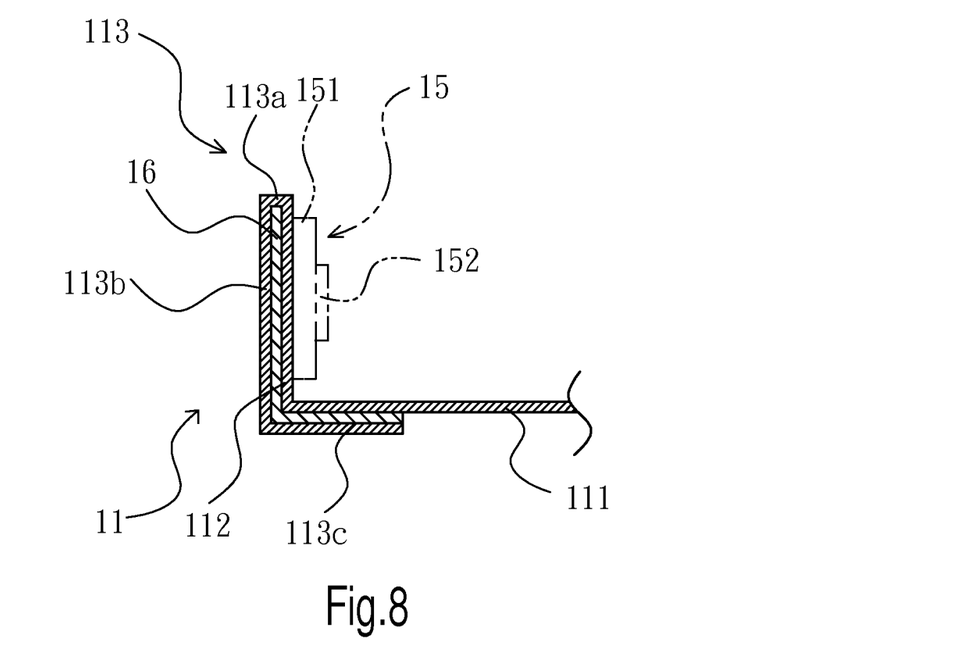
FIG. 8 shows a partial lateral sectional view diagram of a back plate heat dissipation structure of a side light type backlight module according to the fifth embodiment of the present invention.

Please refer to FIG. 8. FIG. 8 shows a partial lateral sectional view diagram of a back plate heat dissipation structure of a side light type backlight module according to the fifth embodiment of the present invention. The back plate heat dissipation structure 11 in the fifth embodiment of the present invention is similar with the side light type backlight module 11 in the fourth embodiment. Therefore, the same indicator and name are followed. The difference is: a distance exists between the first vertical extension part 113b of the back plate heat dissipation structure 11 and the side wall part 112 in the fifth embodiment of the present invention; besides, another distance also exists between the second horizontal extension part 113c and the bottom part 111. In other words, distances exist between respective side wall parts and respective bottom parts. Moreover, as shown in FIG. 8, at least one heat conductive material 16 can be selectively positioned between the side wall part and the bottom part. The heat conductive material 16 can be selected from materials of good heat conduction properties but the present invention is not limited thereto. The heat dissipation efficiency of the side light type backlight module 10 can be raised further with the assistance of the heat conductive material 16.

Figure 9:
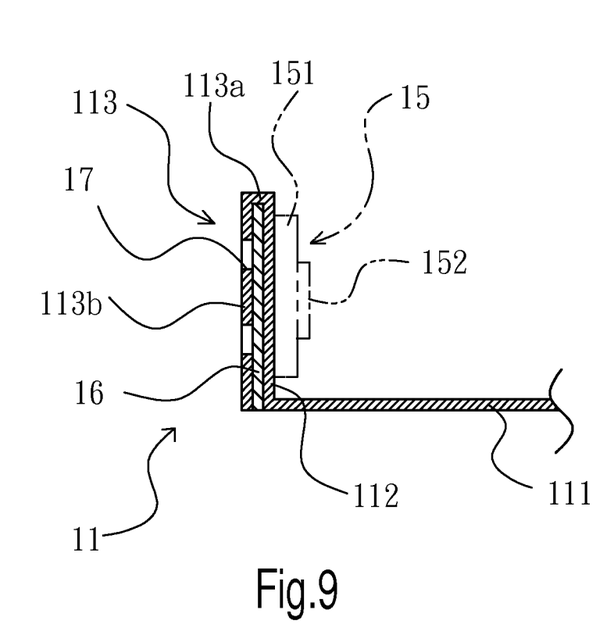
FIG. 9 shows a partial lateral sectional view diagram of a back plate heat dissipation structure of a side light type backlight module according to the sixth embodiment of the present invention.

Please refer to FIG. 9. FIG. 9 shows a partial lateral sectional view diagram of a back plate heat dissipation structure of a side light type backlight module according to the sixth embodiment of the present invention. The back plate heat dissipation structure 11 in the sixth embodiment of the present invention is similar with the side light type backlight module 11 in the second embodiment. Therefore, the same indicator and name are followed. The difference is: a plurality of penetrating thermal vias 17 is positioned on the first vertical extension part 113b of the back plate heat dissipation structure 11. The shapes, sizes and numbers of the thermal vias 17 are not limited in the present invention. The thermal vias 17 can be selectively positioned on the respective vertical extension parts and/or the respective bottom parts to raise the heat dissipation efficiency of the side light type backlight module 10.

Figure 10:
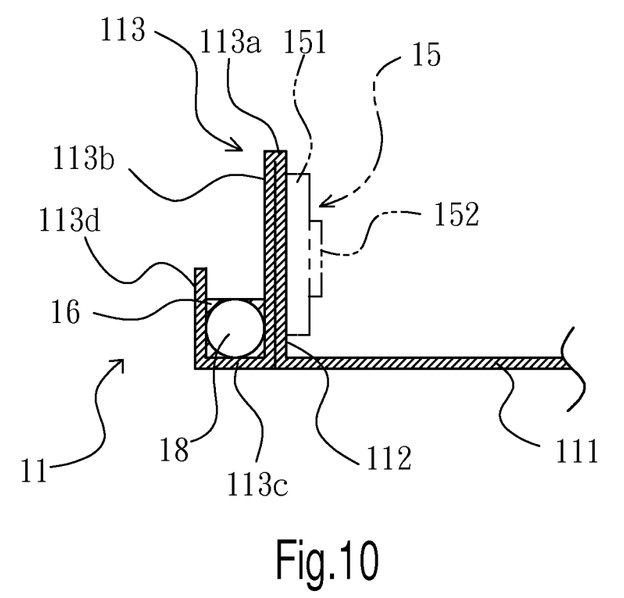
FIG. 10 shows a partial lateral sectional view diagram of a back plate heat dissipation structure of a side light type backlight module according to the seventh embodiment of the present invention.

Please refer to FIG. 10. FIG. 10 shows a partial lateral sectional view diagram of a back plate heat dissipation structure of a side light type backlight module according to the seventh embodiment of the present invention. The back plate heat dissipation structure 11 in the seventh embodiment of the present invention is similar with the side light type backlight module 11 in the fourth embodiment. Therefore, the same indicator and name are followed. The difference is: the second horizontal extension part 113c of the side light type backlight module 11 is formed by the bottom of the first vertical extension part 113b extending outwards horizontally and a second vertical extension part 113d is further formed by the second horizontal extension part 113c extending upwards vertically. At least one heat pipe 18 is positioned between the first vertical extension part 113b and the second vertical extension part 113d. The spaces among the heat pipe 18, the side wall part and the bottom part can be filled up with the heat conductive material 16. The heat pipe 18 is capable of dissipating the heat of the extension part 113 directly according to the real demand to raise the heat dissipation efficiency of the side light type backlight module 10 further. The position of the heat pipe 18 is not limited in the present invention. The heat pipe 18 can be positioned anywhere between the respective side wall parts and the respective bottom parts.

In conclusion, compared with the light source set of the side light type backlight module according to prior at, the heat can only conducted to the center of the side light type backlight module in a single way and the heat dissipation efficiency of the back plate heat dissipation structure cannot be raised. The present invention can utilize the extension part 113 formed by the top of the side wall part 112 of the back plate heat dissipation structure 11 extending outwards to dissipate the heat generated by the at least one light source set 15 at the side wall part 112 (including the heat near the top) for raising the total heat dissipation efficiency of the side light type backlight module 10.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A side light type backlight module, comprising:
a back plate heat dissipation structure, comprising: a bottom part and at least one side wall part, and the bottom part is a main body of the back plate heat dissipation structure, and the at least side wall part is formed by at least one edge of the bottom part extending upwards from the bottom part;
a light guide plate, positioned on the back plate heat dissipation structure; and
at least one light source set, positioned at the inner surface of the side wall part and between the side wall part and the light guide plate, wherein the back plate heat dissipation structure of the side light type backlight module further comprises an extension part, comprising:
a first horizontal extension part, formed by the top of the side wall part extending outwards horizontally;
a first vertical extension part, formed by the outer of the first horizontal extension part extending downwards vertically;
a second horizontal extension part, formed by the bottom of the first vertical extension part extending outwards horizontally; and
a second vertical extension part, formed by the outer of the second horizontal extension part extending upwards vertically;
wherein the first vertical extension part is substantially contiguously attached to the side wall art and the second vertical extension part is substantially contiguously attached to the first vertical extension part, the heat generated by the at least one light source at the side wall part is conducted to the extension part through the top of the side wall part and conducted to the bottom part through the bottom of the side wall part.

2. A back plate heat dissipation structure of a side light type backlight module, comprising:
a bottom part, forming a main body of the back plate heat dissipation structure; and
at least one side wall part, formed by at least one edge of the bottom part extending upwards from the bottom part, wherein at least one light source set is attached to the inner surface of the side wall part; wherein the back plate heat dissipation structure further comprises an extension part, formed by the top of the side wall part extending outwards, and comprising:
a first horizontal extension part, formed by the top of the side wall part extending outwards horizontally;
a first vertical extension part, formed by the outer of the first horizontal extension part extending downwards vertically;
a second horizontal extension part, formed by the bottom of the first vertical extension part extending outwards horizontally;
a second vertical extension part, formed by the outer of the second horizontal extension part extending upwards vertically;
a third horizontal extension part, formed by the top of the second vertical extension part extending outwards horizontally; and
a third vertical extension part, formed by the outer of the third horizontal extension part downwards vertically;
wherein the first vertical extension part is substantially contiguously attached to the side wall part, and the second vertical extension part is substantially contiguously attached to the first vertical extension part, and the third vertical extension part is substantially contiguously attached to the second vertical extension part, and the heat generated by the at least one light source at the side wall part is conducted to the extension part through the top of the side wall part and conducted to the bottom part through the bottom of the side wall part.

3. The back plate heat dissipation structure of the side light type backlight module of claim 2, wherein at least one heat conductive material or at least one heat pipe is positioned between the side wall part and the first vertical extension part.

4. The back plate heat dissipation structure of the side light type backlight module of claim 2, wherein a plurality of penetrating thermal vias is positioned on the side wall part and the first vertical extension part for exposing a back side of a circuit board of the at least one light source set.

5. The back plate heat dissipation structure of the side light type backlight module of claim 2, wherein a plurality of penetrating thermal vias is positioned on the side wall part, the first vertical extension part and the second vertical extension part for exposing a back side of a circuit board of the at least one light source set.

6. The back plate heat dissipation structure of the side light type backlight module of claim 2, wherein the extension part further comprises:
   a second horizontal extension part, formed by the bottom of the first vertical extension part extending inwards horizontally under the bottom part.

7. The back plate heat dissipation structure of the side light type backlight module of claim 2, wherein a plurality of penetrating thermal vias is positioned on the side wall part, the first vertical extension part, the second vertical extension part and the third vertical extension part for exposing a back side of a circuit board of the at least one light source set.

* * * * *